July 28, 1942.   H. E. FARMER   2,291,457
DOUGH STRIP FEED DEVICE
Original Filed Sept. 23, 1939    7 Sheets-Sheet 5

Inventor
HORACE E. FARMER.
By Wallace P. Lamb
Attorney

July 28, 1942.   H. E. FARMER   2,291,457
DOUGH STRIP FEED DEVICE
Original Filed Sept. 23, 1939   7 Sheets-Sheet 6

Inventor
HORACE E. FARMER.
By Wallace P. Lamb
Attorney

July 28, 1942.  H. E. FARMER  2,291,457
DOUGH STRIP FEED DEVICE
Original Filed Sept. 23, 1939   7 Sheets—Sheet 7
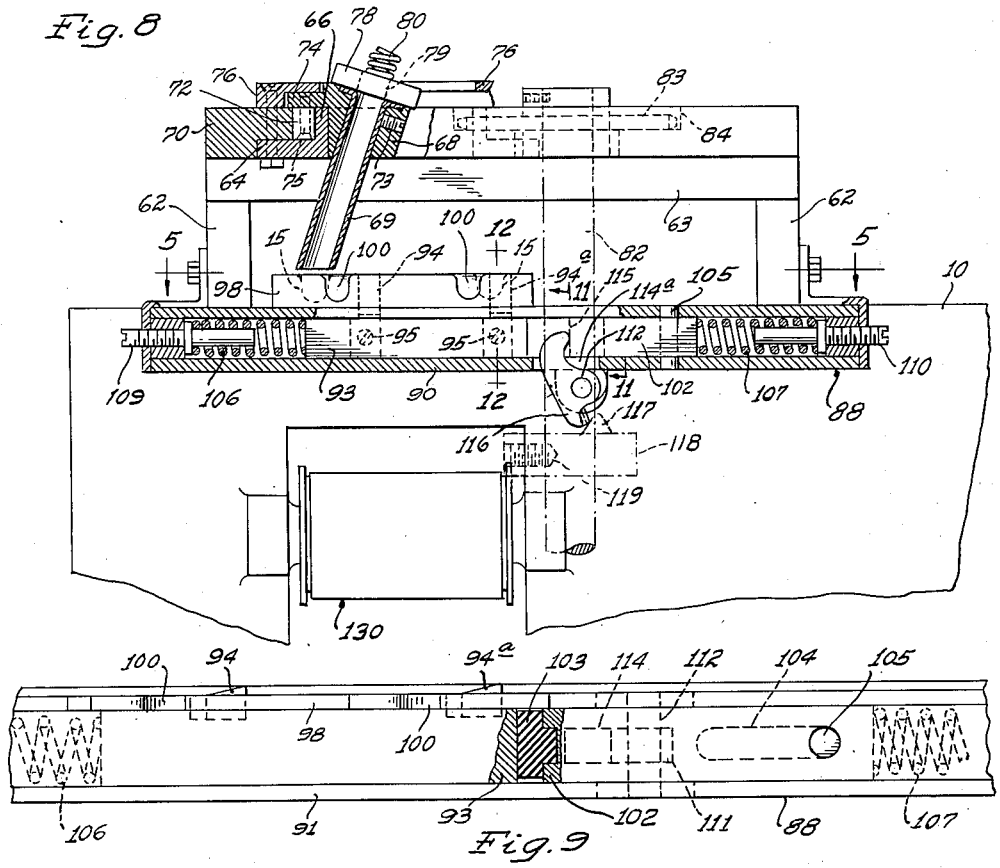
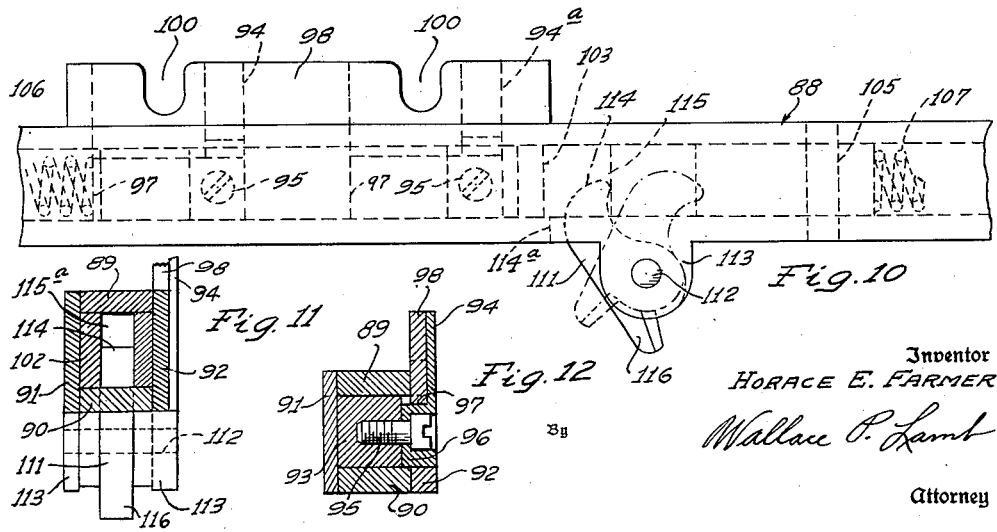
Inventor
HORACE E. FARMER.
Wallace P. Lamb
Attorney Patented July 28, 1942

2,291,457

UNITED STATES PATENT OFFICE 2,291,457

DOUGH STRIP FEED DEVICE

Horace E. Farmer, Grosse Pointe Farms, Mich.

Substituted for abandoned application Serial No. 296,299, September 23, 1939. This application September 8, 1941, Serial No. 410,101

17 Claims. (Cl. 107—14)

This application is a substitute for abandoned application Ser. No. 296,299, filed September 23, 1939 of which the following is a full, clear and exact specification.

This invention relates generally to feeding devices and more particularly to dough strip feed devices.

It is an object of the present invention to provide a new and improved dough strip feed device which will successfully and efficiently extrude strip dough of the desired and proper consistency for pretzel making.

Another object of the invention is to provide improved mechanism for laying the extruding dough strip onto a support or conveyor.

Another object of the invention is to provide a dough strip extruding device of new and improved construction which will extrude a dough strip at a high rate of delivery and of the same consistency as pretzel dough strip commonly obtained by passing lumps of dough on a long conveyor beneath a long rolling surface above the conveyor.

Another object of the invention is to provide a new and improved dough strip feeding and extruding device in which the temperature of the dough is maintained at a desirable, substantially constant temperature to maintain a corresponding desired dough consistency.

Another object of the invention is to provide for cooling of and reduction in surface moisture on the extruding dough strip to maintain desired dough consistency for pretzel making.

It will be understood that dough strip and particularly pretzel dough strip changes in consistency with change of ambient temperature, becomes too moist and sticky or too dry, any or all of which conditions prevent the making of good pretzels.

Another object of the invention is to provide a dough strip feed device having provisions for removing severed dough strip laid onto a support by a traveling guide.

Another object of the invention is to provide a novel dough strip severing or cutting device and one which will not substantially disturb the dough strip on its support.

Other objects of the invention will appear from the following detailed description taken in connection with the accompanying drawings in which—

Fig. 8 is a view of the apparatus shown partly in elevation and partly in section taken substantially along the line 8—8 of Fig. 4.

Fig. 9 is a top plan view of a dough strip cutter device partly broken away and in section.

Fig. 10 is a side view of the cutter device shown in Fig. 9.

Fig. 11 is an end view looking from right to left of Fig. 10 and

Fig. 12 is a cross sectional view of the cutter device, taken along the line and in the direction of the arrows 12—12 of Fig. 8.

Figure 2:
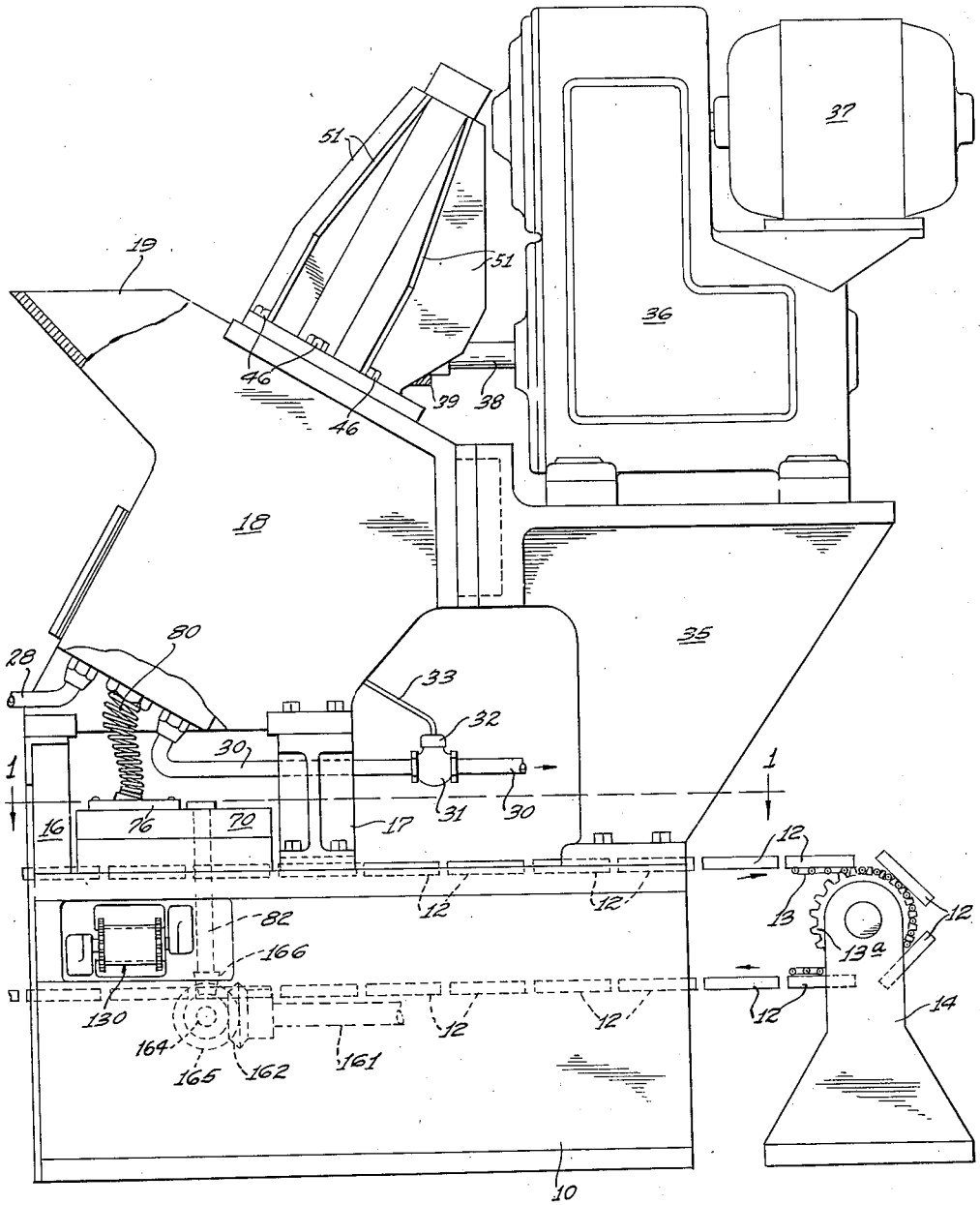
Fig. 2 is a side elevation of the apparatus.

Referring to the drawings by characters of reference, the numeral 10 designates in general, the base of the apparatus, the base 10 being elongated and having a longitudinal slideway 11 for slidably receiving and guiding plates 12 of a dough strip support or conveyor. The plates 12 are attached to a pair of spaced continuous chains 13 which travel about sprockets 13a supported on uprights or standards 14, only one of which is shown, Fig. 2. These plates 12 are each provided in the upper surface thereof with a substantially U-shaped recess 15 and these recesses run out at the ends of the plates such that the ends of the U-shaped recesses face or are directed outwardly from one side of the conveyor.

Figure 3:
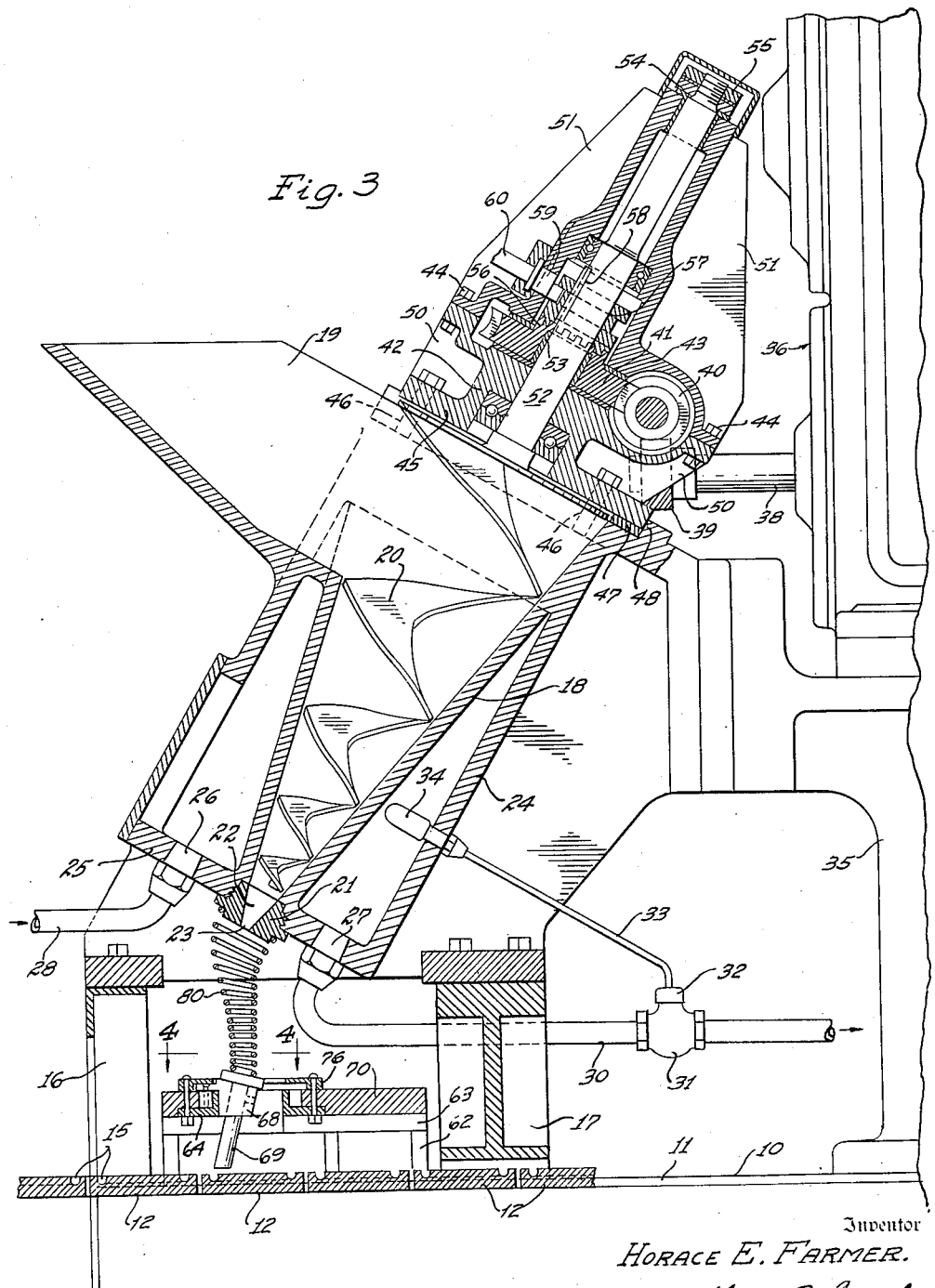
Fig. 3 is an enlarged view broken away and partly in section of parts shown in Fig. 2.

Mounted on the base 10 and rigidly secured thereto on opposite sides of the conveyor plates 12 is a pair of forward upright supports 16 and a pair of rearward upright supports 17 on which is mounted a dough hopper or upper nozzle portion 18 having at its upper end a laterally extending inlet 19 for dough, see Fig. 3. The hopper 18 is conical in shape tapering from a relatively large upper end toward a relatively small lower end and positioned in the hopper is a rotatable screw feed 20. In the lower end of the hopper 18, a removable extruding nozzle 21 is provided with a passage 22 therethrough which tapers from a relatively large upper end, aligning with the lower end of the conical hopper, to a relatively small discharge opening 23. This discharge nozzle passage is conical in form and the angle of taper is greater than the angle of taper of the conical hopper 18. Dough advanced through the conical nozzle 18 by the screw 20 and extruded from the nozzle 21 has all the desirable qualities of strip dough which is rolled in strips from lumps of dough traveling along a conveyor beneath a long rolling surface and in addition can be more easily handled and deposited on the conveyor plates 12 in desired configurations, this strip dough being particularly suitable for making pretzels.

In order to prevent changes in the consistency of the dough in the hopper and nozzle due to temperature changes, the hopper 18 is provided with a jacket 24 therearound for a cooling medium, such as water. The jacket is provided with a bottom wall 25 in which the nozzle 21 is screwthreaded and in the bottom wall 25 is provided an inlet 26 and an outlet 27 to which are connected respectively a water supply line or conduit 28 and a drain line or outlet conduit 30. In the drain conduit 30 is provided a thermostatic valve 31 controlling outflow of water from the water jacket 24 in response to the temperature of the water in said jacket. The valve 31 may be of any suitable well known type, the valve shown being of the type which is charged with a thermostatic fluid in a casing 32, tube 33 and a bulb 34, the latter being positioned in the water in the jacket 24. When the temperature of the water in the jacket 24 rises to a predetermined temperature, the thermostatic fluid in the bulb expands and opens the thermostatic valve in line 30 to permit water to flow out of the jacket and permit cooler water to enter the jacket by the inlet 26.

Mounted on the base 10 and straddling the conveyor plates 12, a support, preferably a casting 35 is provided on which in turn is mounted a speed reduction mechanism 36 driven by an electric motor 37 for driving or rotating the feed screw 20. Projecting externally of the speed reduction mechanism casing, a drive shaft 38 is provided with a helical gear 39 which meshes with and drives a worm gear 40 which in turn drives a worm wheel 41. The worm gear 40 and the worm wheel 41 are enclosed in a casing which is preferably of sectional construction comprising a lower section 42 and an upper section 43. The upper casing section 43 seats on the lower casing section 42, the sections having external-abutting flanges which may be bolted as at 44, or be otherwise rigidly secured together. The lower casing section 42 is provided at its lower end with an external flange 45 which seats on the upper end of the hopper casting and may be rigidly secured thereto by bolts 46 or by other suitable means.

In order to prevent or reduce heat transfer from the lower casing section 42 to the dough hopper casting, I interpose a gasket 47 of heat insulating material between the top of the dough hopper casting and the lower section 42 of the gear casing, this heat insulating material preferably being retained in a recess 48 in the top of the hopper casting. In addition, I provide the lower casing section 42 and the upper casing section 43 with fins 50 and 51 respectively which are preferably cast integral with the casing sections and serve to dissipate or transfer heat from the gear casing to the atmosphere thus further decreasing heat transfer from the gear casing to the dough hopper casting.

Integral with the upper end of the screw feed 20, a shaft 52 extends upwardly therefrom through a bushing 53 in the worm wheel 41, and at its upper end, externally of the upper casing section, the shaft 52 is provided with a nut 54 and lock nut 55 screwthreaded thereon to hold the feed screw 20 up in its proper position. The worm wheel 41 is provided with an upwardly directed clutch jaw 56 co-operable with a downwardly directed clutch jaw on a shiftable clutch member 57 which is keyed as at 58, to and slidable along the shaft 52 above the worm wheel and within the upper casing section 43. The slidable clutch member 57 in the position shown in Fig. 3 operatively connects the worm wheel 41 to the shaft 52 whereby to drive or rotate the feed screw 20. The clutch member 57 is provided with an annular socket to receive a shifter fork 59 which is manually operable by a handle 60 to stop or start the feed screw 20 without stopping the motor 37.

Figure 4:
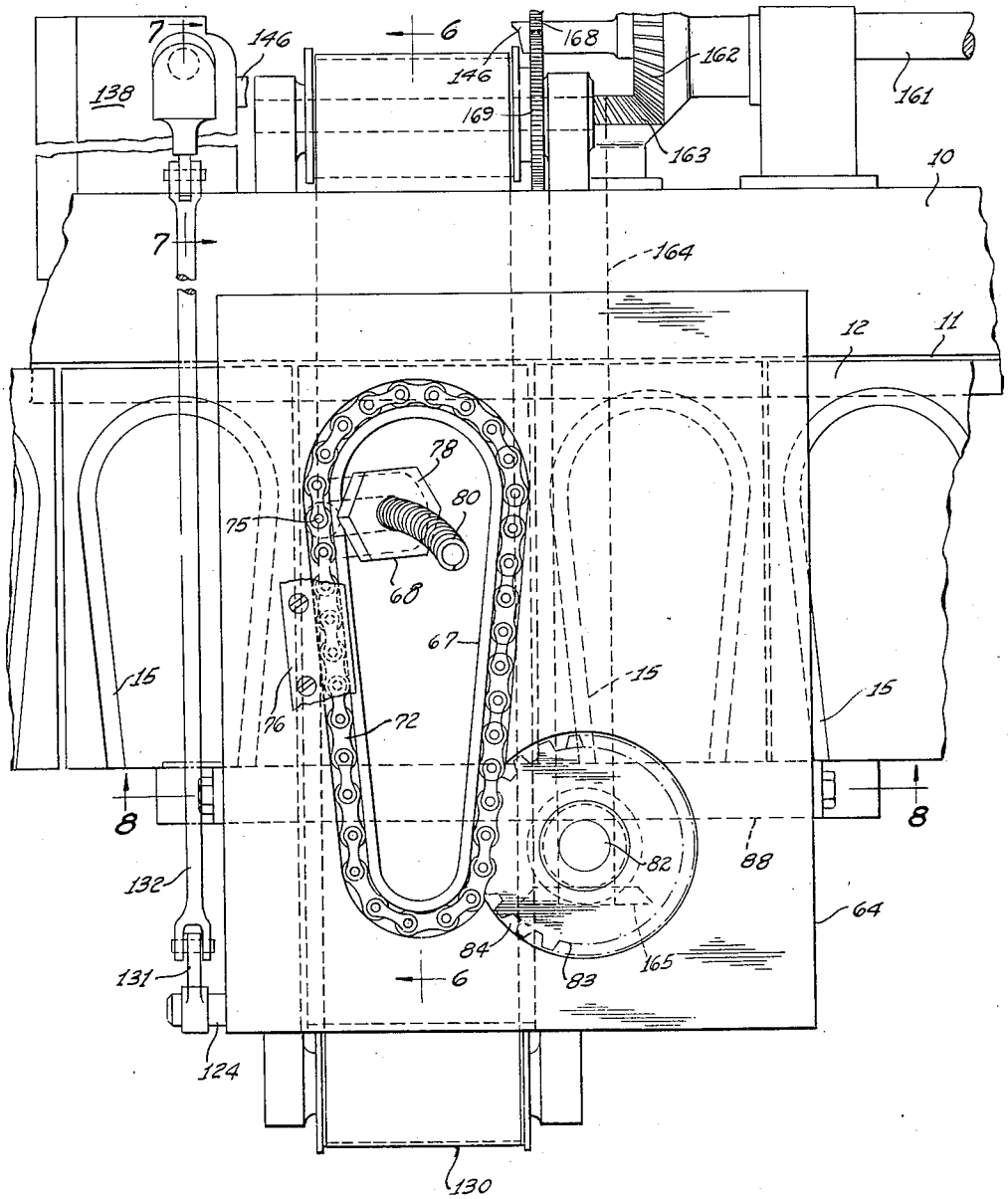
Fig. 4 is a plan view taken substantially along the line 4—4 of Fig. 3.

Mounted on the base 10, below the nozzle 21, are supporting members or spacer plates 62 on opposite sides of the conveyor and mounted on these spacers is a supporting plate 63 on which in turn is mounted a guide or slide track member 64. The supporting plate 63 is provided with an opening 65 therethrough, overlying the conveyor and the track member 64 seats on an inner border portion of the plate 63 and may be rigidly secured thereto by screws or by other suitable means. The track member 64 is provided with an inner upturned flange 66, the inner continuous surface 67 of which serves as a slide track for a traveling carrier member 68 which carries a dough strip guide or strip laying tube 69. As is shown more clearly in Fig. 4, the track overlies and conforms in part to the shape of the indentations 15 in the conveyor plates 12, the track having at one end a relatively large radius of curvature and at the other end having a relatively small radius of curvature joined by straight side portions.

Referring again more particularly to Fig. 6, a plate member 70 is mounted on the lower plate support 63 and is provided with a central opening therethrough, the wall, as at 71, defining said opening being a continuous inner edge of the plate which conforms in form to and is spaced from the track flange 66. The track member 64 and the plate member 70 co-operate to provide an upwardly facing continuous guide slot or recess in which a continuous chain 72 travels (see Fig. 4), and to which chain is secured the carrier member 68, carrying the dough laying guide tube 69. As shown in Fig. 8, the tube 69 is open ended and the upper end portion is sleeve fitted into a bore through the carrier 68 to which the sleeve may be secured by a set screw 73. The carrier member or body 68 is a metallic block having an outer wall surface slidably engaging the inner opposed slide track surface and is provided with a laterally extending flange 74 which overlies the chain track or groove, the flange 74 being apertured to receive one or more extended pins 75 of the chain links to attach securely the carrier to the chain 72. Mounted on top of the plate 70 is a rim-like hold-down plate 76 which is rabbeted at its lower inner edge providing a downwardly facing slide surface overlying and spaced above the chain 72, the upper surface of the carrier extended portion or flange 74 slidably engaging said slide surface. The plate 70, slide track member 64, and hold-down plate 76 co-operate to provide an inwardly facing continuous groove or slot in which the bearing flange 74 of the traveling carrier 68 is slidably guided and these plates may be rigidly secured together by bolts or by other suitable means.

Secured onto the top of the carrier 68 is a connecting member 78 having a central aperture 79 registering with the upper open end of the tube 69, and the lower end of a helical coil spring 80 registers with the aperture 79 and may be welded or be otherwise suitably secured to the connecting member 78. The other or upper end of the spring 80 registers with the lower end of the dough discharge nozzle 21 and may be welded or be otherwise suitably secured thereto. This helical coil spring 80 constitutes a flexible connection for the passage of strip dough from the stationary nozzle 21 to the traveling dough laying or guide tube 69 and in addition subjects the extruding dough strip to the air such that if the moisture content of the dough strip will be taken up by the air and thus reduced in the event it is excessive for good pretzel dough strip. While I prefer to employ a helical coil spring for the flexible connection between the nozzle 21 and the traveling tube 69, the invention contemplates any flexible connection having provisions for the entrance of outside air to dry the dough strip.

A vertical driven shaft 82 extends upwardly above the base 10, through the plates 63 and 70 and fixed to and adjacent the upper end of the shaft 82 is a sprocket 83 which meshes externally with and drives the chain 72 thus to cause the carrier 68 and tubular guide 69 to travel about the substantially oval track. As is clearly shown in Fig. 4, the sprocket 83 seats in a recess 84 provided in the top of the upper plate 70, the recess 84 intersecting the chain track to provide for meshing of the sprocket and chain.

During operation of the apparatus, the dough strip guide or laying tube travels continuously and the conveyor is intermittently operated as will later be seen to present successively the conveyor plates 12 beneath the track to receive a strip of dough. The tubular dough strip guide 69 in traveling about its track lays a strip of dough in the indentation 15 of a plate 12 and during part of its travel moves over and lays the dough strip onto a plate 86 which is slidably supported on the top of the base 10 transverse to the conveyor for a purpose hereinafter fully described. At the terminal ends of the U-shaped indentation 15, the strip is severed, leaving a U-shape strip of dough on the conveyor plate and a smaller dough strip on the plate 86 which, after the cutting operation is movable to dispose of the strip thereon which operation is hereinafter described.

A cutter is provided for severing the dough strip and includes an elongated or rectangular casing 88 which is rigidly mounted adjacent the top of the base 10 below and adjacent the underside of the slidable plate 86. The casing 88 extends longitudinally of the conveyor beneath the slidably movable plate 86 and adjacent one end edge of the conveyor plate 12 which is positioned to receive a dough strip. This casing is formed, in the present instance, of elongated or substantially rectangular plate members including a top plate member 89, a bottom plate 90, and opposite side plates 91 and 92 cooperating to provide a hollow, elongated rectangular casing. The casing plate members 89, 90, 91 and 92 may be welded together or may be rigidly secured together by screws or by other suitable means. Disposed within the casing 88, an elongated, rectangular carrier member 93 is slidably reciprocal therein and carries preferably two spaced knives or cutting blades 94, 94a which may be rigidly secured to the carrier 93 by screws 95 or by other suitable means. These blades or knives 94 are preferably each provided with a boss 96 which extends respectively through elongated clearance slots 97 in the casing side wall 92 into abutment with the adjacent opposed side of the carrier 93, the bosses 96 being movable longitudinally in the slots 97. The casing side wall 92 is provided with an upwardly directed, extended portion 98 which extends between the opposed edges of the plate 86 and the conveyor plate which is in position to receive a dough strip, and this extension 98 is provided in its upper edge with spaced notches 100 with which register the terminal ends of the indentation 15 of the plate presented for a strip of dough. The extension 98 is spaced from the edge of the plate 12 to permit reciprocation of the knives or blades 94 therebetween, the blades slidably engaging the outer surface of the extended portion 98, also slidably mounted in the casing 88, an elongated rectangular hammer 102 is provided having secured to its inner end, a resilient, preferably rubber, bumper 103 to abut the inner end of the blade carrier 93. In this hammer 102 is a slot 104 therethrough which is elongated longitudinally thereof and receives a pin 105 having its ends respectively secured in the casing top and bottom walls 89 and 90, the pin 105 serving as a stop to limit reciprocal movement of the hammer 102 in opposite directions. Within the casing 88 at opposite ends thereof are opposed helical coil springs 106, 107 which act to return the knife carrier and hammer to a starting position, shown in Fig. 8, in which position the cutting blades 94, 94a are spaced respectively and slightly to the right of the dough strip receiving notches 100. These notches 100 hold the dough strip against movement in the direction of movement of the blades and assist the blades in making a good clean cut. The springs 106, 107 are under compression and the tension thereof may be regulated, as desired, by adjustment screws 109 and 110 respectively. The hammer 102 is drawn back away from the knife carrier 93, further compressing spring 107, by a trigger member 111 which is pivoted on a pin 112, supported in depending ears 113 which are integral with the casing bottom wall 90. The trigger 111 is provided with an upwardly extending arm 114 which extends through a slot 114a in the casing bottom wall 90 and upwardly into a slot 115a in the hammer 102 to engage the end wall 115 of said slot. A downwardly extending arm 116 of the trigger 111 is arranged to be engaged by a cam-like abutment 117, integral with and projecting upwardly from a collar 118 which may be secured by a set screw 119 to the chain operating vertical driven shaft 82.

Figure 5:
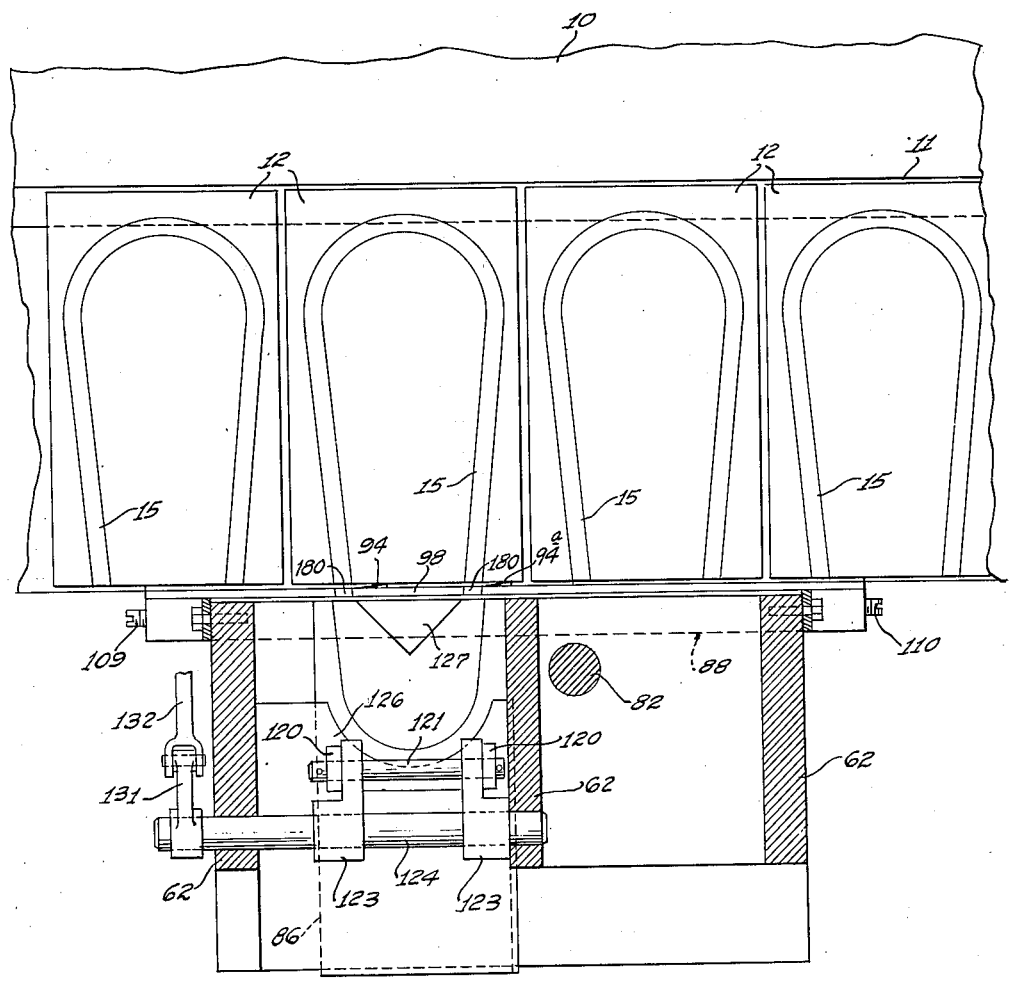
Fig. 5 is a plan view partly in section, taken along the line 5—5 of Fig. 8.
Figures 6, 7:
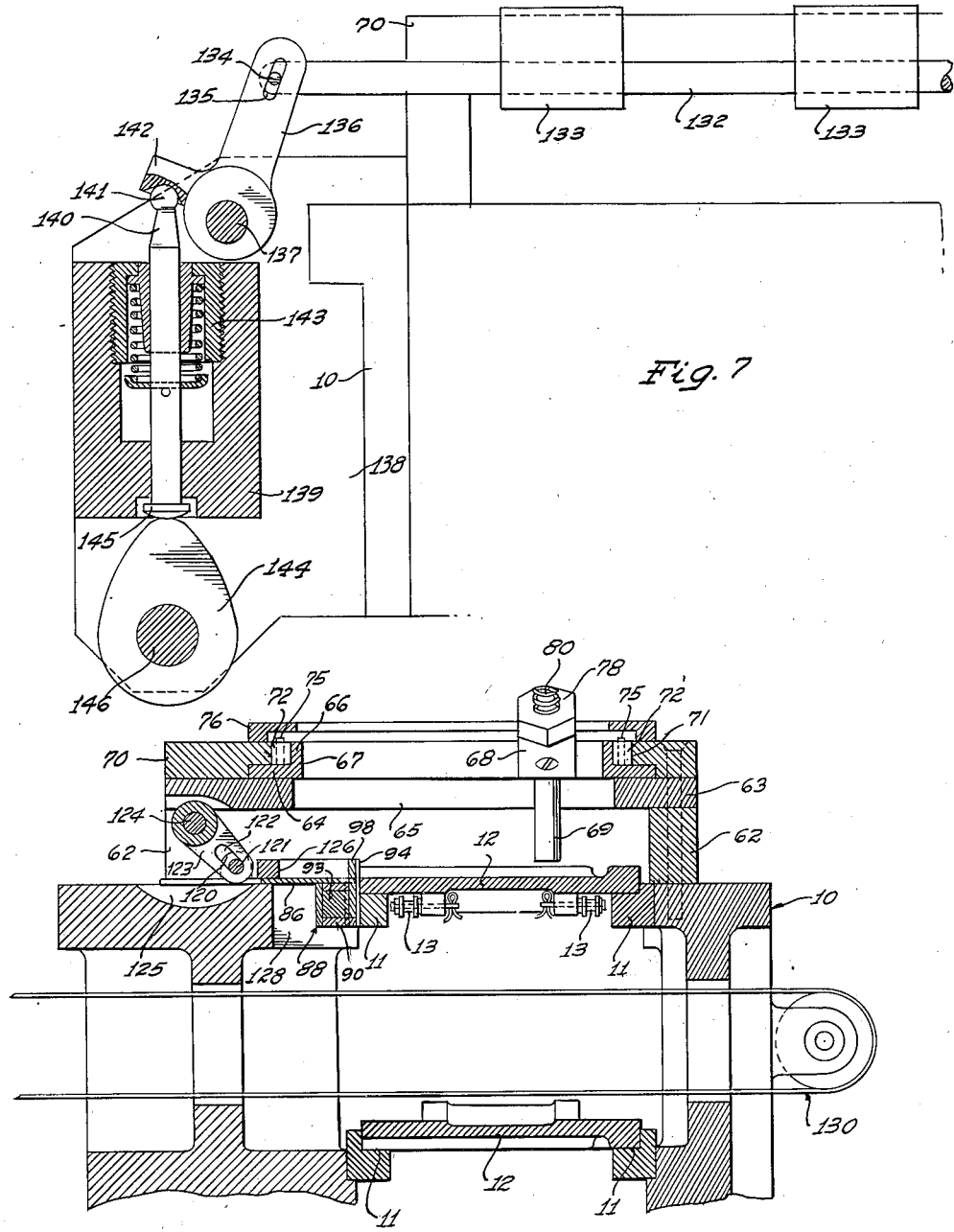
Fig. 6 is a view of part of the apparatus shown partly in elevation and partly in vertical section, taken along the line 6—6 of Fig. 4.
Fig. 7 is a detail view partly in section taken along the line 7—7 of Fig. 4.

Referring now more particularly to Figs. 5, 6 and 7, the slidable plate 86 is provided with a pair of upstanding ears 120 having aligned apertures to receive a pin 121 which is also received in aligning slots 122 in a pair of spaced levers 123, secured at their upper ends to a rotatable shaft 124, the shaft 124 being journaled in bores in a pair of the upstanding spacer members or plates 62. In the top of the base 10, below the levers 123, clearance slots 125 are provided for the levers 123 which when pivoted, clockwise (Fig. 6), draw or slide the plate 86 to the left. Supported above the plate 86 is a fixed stripper plate 126 against which the strip of dough on the slidable plate 86 abuts on sliding of the plate 86 to the left causing the dough strip to fall through an opening 127 in the plate 86 and through an opening 128 (Fig. 6), in the base 10 thus disposing of the strip, after which the plate 86 is returned to its dough strip receiving position adjacent the conveyor. A conveyor 130 may be disposed below and extend under the main conveyor to carry away the strips of dough discharged from the slide plate 86 and these strips of dough may be returned to the dough hopper.

Secured to one end of the rotatable shaft 124 is an operating lever 131 to the lower end of which is pivotally connected one end of a connecting rod 132 which extends transversely of and above the main conveyor and is slidably supported and guided in bearing members 133 which are secured to be upper track plate 70 (Fig. 7). The other end of the connecting rod 132 is provided with a pin 134 which slidably and pivotally engages in a slot 135 in the upper end of a lever 136 which is pivoted, as at 137, to a bracket 138, rigidly secured to the base 10. Mounted on the bracket 138 is a casing 139 in which a vertically reciprocal push rod 140 is slidably received and guided, the push rod 140 having, in the present instance, a rounded upper end 141 adapted to engage in a downwardly facing socket in an arm 142 of the lever 136. The push rod 140 is urged downwardly by a helical coil spring 143 and the push rod is moved upwardly against the action of spring 143 by a cam 144 on which the lower end 145 of the push rod rides, the cam 144 being secured on a rotatable shaft 146.

Figure 1:
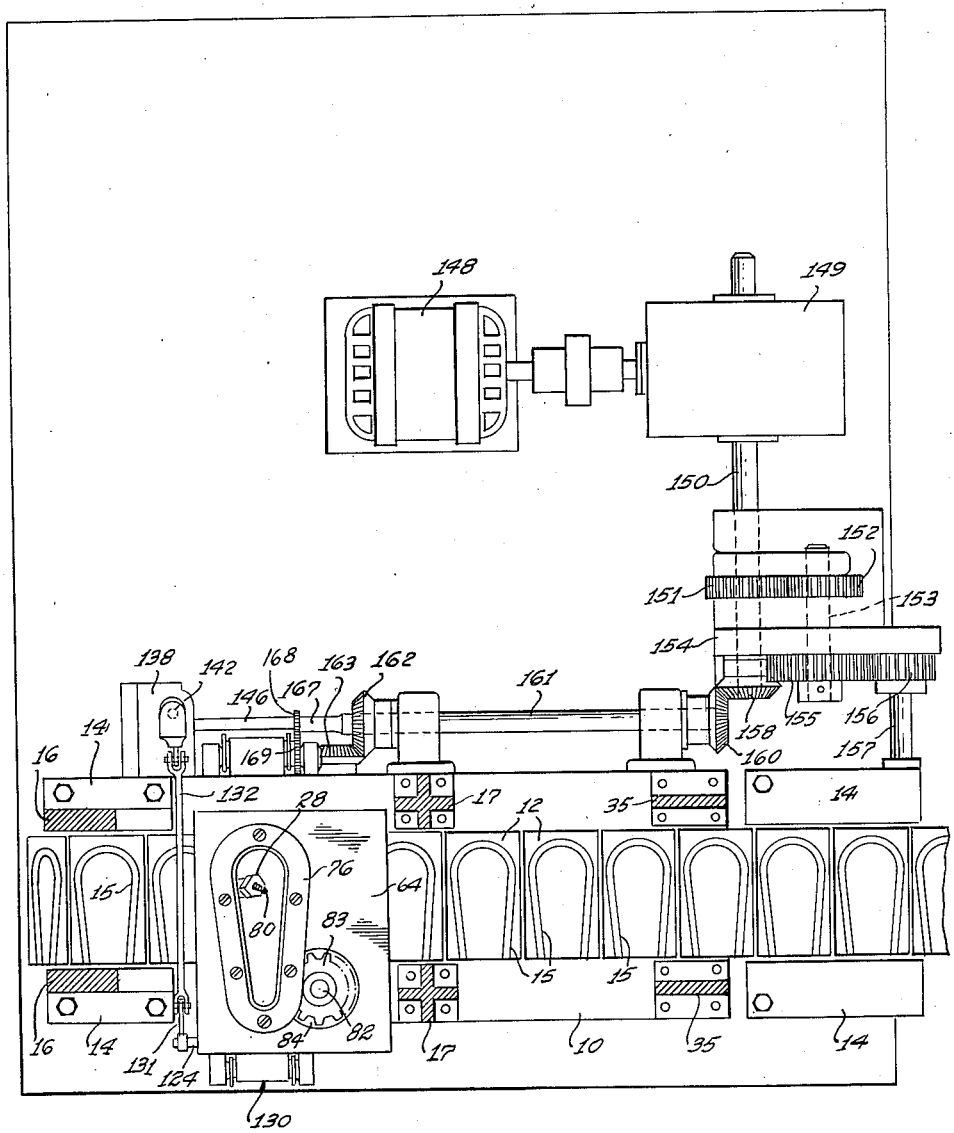
Figure 1 is a general plan view of my apparatus shown partly in section, taken substantially along the line 1—1 of Fig. 2.

Referring to Fig. 1, the various operating devices may be driven by an electric motor 148 through a speed reduction mechanism 149. Mounted on and secured to driven shaft, as at 150, of the speed reduction mechanism 149, a gear 151 in mesh with a gear 152 secured on a shaft 153 which drives a Geneva motion mechanism 154 for intermittently operating the main conveyor. Secured on the shaft 150 posterior to the Geneva motion mechanism 154, a gear 155 meshes with a gear 156 on a shaft 157 on which the conveyor drive sprockets 13a are secured. Also mounted on and secured to the speed reduction mechanism shaft 150 is a bevel gear 158 meshing with a bevel gear 160 on a shaft 161 which extends longitudinally of the conveyor. Secured onto the shaft 161 is another bevel gear 162 which meshes with a bevel gear 163 on a shaft 164 (Fig. 4), which drives the vertical shaft 82 through bevel gears 165, 166, see Fig. 2. Also, on shaft 161 or on the reduced portion 146 of said shaft is secured a gear 168 which meshes with a gear 169 to drive the conveyor 130, the cam 144, as previously mentioned, also being secured to the reduced shaft portion 146.

In operation, the motor 148 (Fig. 1), driving the Geneva motion mechanism 154 drives the main conveyor intermittently or by stations for successively presenting the conveyor plates 12 to the dough strip feed device to receive a strip of dough. Also, the motor 148 drives the traveling dough strip laying or guide tube 69 through shaft 150, gears 158, 160, shaft 161, gears 162, 163, shaft 164, gears 165, 166, vertical shaft 82, sprocket 83 and chain 72 to which the body 68 of the guide tube 69 is attached. In addition, the motor 148 drives shaft 167 and through gears drives the conveyor 130 which as previously mentioned carries away strips of severed dough strip to be returned by an operator to the dough hopper 18. With the feed screw motor 37 operating the speed reduction mechanism 36 and with the clutch 57 in, the screw 20 will be rotating and feeding dough down the conical hopper or upper nozzle portion 18 to the lower nozzle portion 21.

At the nozzle discharge 23, dough strip will be extruded and during passage of the dough through the lower nozzle portion 21, the dough, because of the difference in taper of the lower nozzle passage 22 and the taper of the passage of the upper nozzle portion 18, the dough will be crowded into the passage 22 and be caused to rotate therein while advancing longitudinally of the nozzle. This results in a wiping action which gives the dough strip a smooth outer surface desired in pretzel dough strip to obtain the well known smooth hard outer surface on a baked pretzel. While the dough is passing through the upper and lower nozzle portions, the thermostatic valve 31, controlling flow of a cooling medium, such as cold water, to the hopper or nozzle jacket 24 keeps the dough at a desired, substantially constant temperature to prevent change in the consistency of the dough. Also, by reason of the open work connecting member or helical coil spring 89 which connects the nozzle discharge 23 to the traveling tube 69, air dries the dough taking up the excess moisture therefrom, so that the dough strip extruded will not be too moist and sticky for best results. In addition, transfer of heat from the gear drive mechanism casing on top of the nozzle is reduced by the heat insulating material 47 therebetween, aided by the heat radiating fins 51 of the gear casing.

Each time the dough laying guide tube 69 travels about its track it lays a strip of dough in the indentation 15 of a plate 12 immediately therebeneath and also lays the strip in the holding notches 100 and on the reciprocal slide plate 86. The tube 69 may travel in a clockwise direction, facing Fig. 5 and starting its dough laying operation on the plate 86 travels over the conveyor laying a strip of dough in the U-shaped indentation of the presented plate. After the tube 69 leaves the conveyor to travel over the plate 86, the trigger 111 is engaged by the cam member 117 and pivoted in a clockwise direction facing Figs. 8 and 10 which moves the hammer 102 to the right compressing the spring 107, the knife carrier 93 being limited in its movement to the right by the stop bosses 96 engaging in the right hand ends of the clearance slots 97. This spaces the rubber impact end 103 of the hammer 102 from the opposed end of the knife 93. When the cam member 117 moves out of engagement with the trigger 111, spring 107 is free to thrust the hammer 102 to the left, the rubber end 103 of the hammer striking the opposed end of the knife carrier 93 and driving it with great speed to the left whereupon the blades 94 and 94a sever the dough strip leaving a U-shaped strip on the conveyor plate. Thus, after travel of the tube 69 over the presented conveyor plate 12, the cutter is operated to sever the dough strip leaving a U-shaped strip of dough in the plate indentation 15 and a shorter strip of similar shape on the plate 86. During travel of the tube 69 over the plate 86, cam 144 on shaft 146 which is also driven by the motor 148 raises rod 140 which pivots lever 136 pushing rod 132 to the right (Fig. 7), which pivots lever 131 and rotating shaft 124 swings lever 123 clockwise (Fig. 6) drawing back the plate 86 away from and transverse to the main conveyor. When this occurs, the dough on slide plate 86 engages the edge face 126 of the stripper plate which causes the dough to fall off the inner edge of plate 86 through opening 127 and 128 down onto the conveyor 130. On this conveyor 130, the dough may be conveyed to a suitable point for collection and return to the dough hopper.

It will be noted that the groove and therefor the chain 72 to which the tube 69 is attached, immediately overlies the recess or indentation in the plate 12 presented to receive a strip of dough and that the tube is on an angle such that the lower discharge end thereof travels the same distance as the axis of a pin of the chain. As a plate receives a strip of dough and the strip is severed, the conveyor is advanced to present or position the next plate to receive a strip of dough.

What I claim and desire to secure by Letters Patent of the United States is:

1. In a dough strip feed device, a nozzle having a discharge outlet, a travelling hollow guide member having a passage therethrough for dough and operable for laying strip dough onto a support, said guide member having a larger capacity than the capacity of the outlet of said nozzle and a connecting member connecting the outlet of said nozzle and the passage of said guide.

2. In a dough strip feed device, a nozzle for extruding strip dough and having a discharge outlet, means for discharging dough from said outlet, a travelling tubular guide member for laying strip dough onto a support and having an inlet and an outlet, a coiled wire having one end connected to the outlet of said nozzle and having the other end thereof connected to the inlet of said tubular guide member.

3. In a dough strip feed device, a stationary nozzle for extruding dough in strip form and having a discharge outlet, means for discharging dough from said outlet, a travelling guide member for laying strip dough onto supporting means and having a passage therethrough for the dough, a flexible member having a passage therethrough for the dough strip and connecting the discharge outlet of said nozzle to the passage of said travelling guide, and a reciprocal cutter for severing the dough strip on the supporting means and operable in accordance with travel of said guide member.

4. In a dough strip feed device, a travelling member having a passage for dough and operable to lay a strip of dough partly onto one supporting member and partly onto a second and adjacent supporting member, a cutter operable to sever the dough strip and movable between said supporting members, said cutter being operable in accordance with travel of said member, said second-named supporting member being movable toward and away from said one supporting member and on movement away from said one supporting member disposing of the strip portion carried thereby, means operable after severing of said strip to move said second-named supporting member away from said first-named supporting member and operable in accordance with travel of said travelling member.

5. A dough strip cutter comprising, a reciprocal cutter, a reciprocal hammer operable to strike and actuate said cutter, guide means for said cutter and said hammer, spring means urging said cutter toward said hammer, stop means limiting movement of said cutter toward said hammer, spring means operable to thrust said hammer to strike and move said cutter, and means operable to release said last-named spring means.

6. A dough strip cutter comprising, a casing, a reciprocal cutter in said casing, a reciprocal hammer in said casing for striking and moving said cutter in one direction, spring means urging said cutter in the opposite direction toward said hammer, means limiting movement of said cutter in said opposite direction, spring means operable to thrust said hammer in said opposite direction to strike and move said cutter in said one direction, and a trigger member operable to move said hammer away from said cutter and release said hammer for movement by said second-named spring means.

7. In a feed device for depositing material onto supporting means, a plate overlying the supporting means and having an opening therethrough, a continuous guide groove in the upper surface of the plate, said groove surrounding said opening, a driven member operable to travel in said guide groove, and means having a passage therethrough for dough and carried by said driven member, said last-named means having an outlet and being arranged such that the outlet travels in a path immediately below said groove.

8. In a dough strip feed device for depositing a strip of dough onto a support, a plate member arranged over the support and having an opening therethrough, a plate member positioned in said opening and cooperable with the wall defining said opening to provide an upwardly facing continuous groove, said second-named plate member having an opening therethrough defined by a continuous guide wall, a third and holddown plate member overlying said upwardly facing groove, a driven continuous chain in said groove, a dough strip depositing member connected to said chain, and a guide member carrying said last-named member and slidably engaging said guide wall and the underside of said third-named plate.

9. In a dough strip cutter comprising supporting means, a reciprocal carrier mounted on said support, a cutting blade on said carrier for severing the dough strip, a pair of opposed springs acting to move said carrier in opposite directions, and means operable to compress and release one of said springs to thrust said carrier in one direction.

10. A dough strip cutter comprising a support having a groove to receive the dough strip, a reciprocal member slidably engaging one side surface of said support and reciprocable transverse to said groove, a cutter carried by said member, a pair of opposed coil springs acting to reciprocate said member in opposite directions, and a trigger operable to compress and release one of said springs.

11. In a dough strip feed device, a nozzle having a discharge outlet, a travelling guide member having a passage therethrough for the dough strip, said passage being larger in cross section than said outlet so as not to decrease the cross sectional area of the dough strip passing therethrough, and a flexible conduit connecting said discharge outlet and said guide member, said conduit having a larger internal diameter than said discharge outlet and having openings intermediate the ends thereof to atmosphere.

12. In a dough strip feed device, a stationary nozzle having a discharge outlet, a travelling guide member having a passage therethrough for the dough strip, said passage being larger in cross section than said outlet so as not to decrease the cross sectional area of the dough strip passing therethrough, and a flexible conduit connecting said discharge outlet and said guide member, said conduit having a larger internal diameter than said discharge outlet and having openings intermediate the ends thereof to atmosphere.

13. In a feed device, a nozzle having a discharge outlet, a travelling guide member having a passage therethrough for the dough strip, said passage being larger in cross section than said outlet, and a flexible conduit connecting said discharge outlet and said guide member, said conduit having a larger internal diameter than said discharge outlet and having openings intermediate the ends thereof to atmosphere.

14. In a dough strip feed device, supporting means, a supporting member reciprocal toward and away from said supporting means, a travelling member movable over said supporting means and said supporting member to lay a strip of dough thereon, a cutter to sever the dough strip and operable in accordance with travel of said travelling member, said reciprocal supporting member on movement away from said supporting means disposing of the strip portion thereon, means operable after severing of the dough strip to move said supporting member away from said supporting means and operable in accordance with travel of said travelling member.

15. In a dough strip feed device, supporting means, a supporting member reciprocal toward and away from said supporting means, a travelling member movable to lay a strip of dough partly onto said supporting means and partly onto said supporting member, cutter means operable to sever the dough strip and leave a portion of the dough strip on said supporting means and a portion of the dough strip on said supporting member, stripper means for removing the portion of the dough strip on said supporting member therefrom during movement of said supporting member away from said supporting means, and means operable to move said supporting member toward and away from said supporting means and operable in accordance with travel of said travelling member.

16. A dough strip cutting device comprising, a reciprocal cutter, reciprocal thrust means operable to strike and move said cutter in one direction, guide means for said cutter and said thrust means, means urging said cutter toward said thrust means, stop means limiting movement of said cutter toward and spacing said cutter from said thrust means, and releasable means operable to move said thrust means to strike and move said cutter.

17. A dough strip cutting device comprising, cutting means, a reciprocal carrier for said cutting means, a reciprocal hammer to strike and move said carrier in one direction, guide means for said carrier and said hammer, means urging said carrier toward said hammer, stop means limiting movement of said carrier toward and spacing said carrier from said hammer, releasable means operable to move said hammer toward and strike said carrier to move said carrier in one direction, and resilient means carried by said hammer for striking said carrier.

HORACE E. FARMER.